United States Patent [19]
Stephenson

[11] Patent Number: 5,980,010
[45] Date of Patent: Nov. 9, 1999

[54] SCANNING INK JET PRINTER FOR ELECTRONIC DISPLAYS

[75] Inventor: Stanley W. Stephenson, Spencerport, N.Y.

[73] Assignee: Eastman Kodak Company, Rochester, N.Y.

[21] Appl. No.: 08/885,606

[22] Filed: Jun. 30, 1997

[51] Int. Cl.$^6$ ........................................................ B41J 3/00
[52] U.S. Cl. ............................ 347/2; 358/906; 358/909.1
[58] Field of Search ........................ 347/1, 2, 3; 358/906, 358/909.1

[56] References Cited

U.S. PATENT DOCUMENTS

| | | |
|---|---|---|
| 4,839,741 | 6/1989 | Wilson . |
| 5,047,870 | 9/1991 | Filo . |
| 5,070,410 | 12/1991 | Hadley . |
| 5,532,741 | 7/1996 | Tsutsumi ................................. 348/239 |
| 5,757,388 | 5/1998 | Stephenson .................................. 347/2 |

*Primary Examiner*—John Barlow
*Assistant Examiner*—Michael S Brooke
*Attorney, Agent, or Firm*—Raymond L. Owens

[57] ABSTRACT

An attachable printer for use with a electronic camera having an image sensor which captures an image of a subject onto the image sensor is disclosed. The camera includes electronics coupled to the image sensor for storing a digital image of the subject; a display; and circuitry coupled to the display and responsive to the stored digital image and effective in a first condition for producing a correctly oriented image on the display and in a second condition for producing a mirror image on the display. The printer is effective when connected in operative relationship to the display and having a moveable carriage, and a scanner and an ink jet printhead mounted on the carriage, and being arranged so that as the carriage moves, the scanner scans the mirror image on the display and produces image signals; and the ink jet printhead being responsive to the signals produced by the scanner for producing a correctly oriented image onto the receiver sheet.

7 Claims, 2 Drawing Sheets

SCANNING INK JET PRINTER FOR ELECTRONIC DISPLAYS

FIELD OF THE INVENTION

The present invention relates to ink jet printing images off a display and, more particularly, to ink jet printing images off a display which can be used in a electronic camera.

BACKGROUND OF THE INVENTION

It is known in the prior art to provide an electronic camera which uses an area image sensor. Digital images produced from the image sensor are stored in memory and these images can be shown on a display so that the user can determine which image should be stored for use in producing hard copy images. Typically, these images can be stored in a magnetic disk or a compact memory card.

A shortcoming with prior electronic cameras is that the printer is spaced from the camera and must be electrically coupled to digital storage structure within the camera. Such printers are expensive in that the image must be transmitted and stored within a printer. The printer and the camera must contain transmission means and a transmission protocol. Transmission means within the camera increase camera size and cost.

Document scanners that print simultaneously with scanning have been disclosed in prior art. One difficulty in such systems is that an image must be mirrored in the copying process. U.S. Pat. No. 4,839,741 discloses a belt that translates to move a scanning device simultaneous with motion of an ink jet cartridge in an opposite direction using a common belt. The image is mirrored by the counter directional motion of the printhead and scanhead. This process requires incrementally advances of the document on each print/scan cycle.

A portion of U.S. Pat. No. 5,047,870 discloses a photocopy machine that translates a scan/print head in two dimensions to copy a stationary document. As the head moves, a thermal paper is moved with the motion of the scanning head across the source document to create a mirror image. U.S. Pat. No. 5,049,999 does not translate the scanning head in two directions, instead, a source and copy sheet moves in opposite directions to form a non-mirrored image.

U.S. Pat. No. 5,070,410 discloses a common substrate supporting both scanning and ink jet printhead. U.S. Pat. No. 5,070,410 also discloses the use of a plurality of elements sensitive to different wavelengths of light and associated inks that permit for color imaging using such scan means. Furthermore, U.S. Pat. No. 5,070,410 also disclose the use of the apparatus to provide hard copy for unmirrored illuminated slides.

SUMMARY OF THE INVENTION

It is therefore an object of the present invention to provide an scanner ink jet printer which is attachable to a display, particularly a display on a digital camera and which produces high quality images on a receiver.

This object is achieved by an attachable printer for use with a electronic camera having an image sensor and means for focusing an image of a subject onto the image sensor, the improvement comprising:

a) electronic means coupled to the image sensor for storing a digital image of the subject;

b) a display;

c) means coupled to the display and responsive to the stored digital image and effective in a first condition for producing a correctly oriented image on the display and in a second condition for producing a mirror image on the display;

d) a printer disposed in operative relationship to the display and having a moveable carriage, and a scanner and an ink jet printhead mounted on the carriage, and being arranged so that as the carriage moves, the scanner scans the mirror image on the display and produces image signals; and e) the ink jet printhead being responsive to the signals produced by the scanner for producing a correctly oriented image onto the receiver sheet.

ADVANTAGES

It is an advantage of the present invention to provide printer that creates a print of an image on a display on the back of electronic cameras. It is a further advantage to provide such apparatus without the need for complex mirror image compensation in the printer. It is a further advantage of the invention to provide for a scanning ink jet system having a small, conformable body that connects to an electronic camera. Scanner ink jet printer combinations, in accordance with the present invention, can scan an image on a camera display and cause that image to be ink jet printed with a proper orientation on a receiver sheet.

BRIEF DESCRIPTION OF THE DRAWINGS

FIG. 1b is a side sectional view showing portions of the printing unit of FIG. 1a;

FIG. 3 is a top section view of an electronic camera which is adapted to be coupled to a printer to be coupled to the electronic printer of FIG. 1a;

FIG. 4 is a top section view of a printing unit view showing portions of the printing unit of FIG. 1a.

DETAILED DESCRIPTION OF THE INVENTION

The invention is directed to a compact printer used in conjunction with electronic cameras. Such cameras often have a flat panel color display that is used to frame and/or review capture images. Separable printers exist that receive data from the electronic capture devices. Typically, interface electronics are required in each device and the image data is transmitted from the electronic camera to the printer.

Figure 1A:
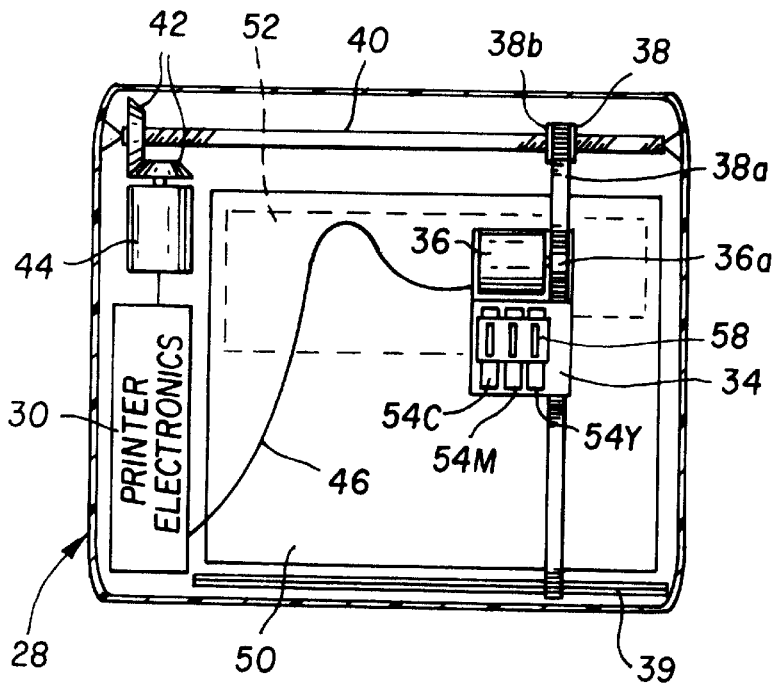
FIG. 1a is a front sectional of an electronic printer which is adapted to be coupled to an electronic camera in accordance with the present invention.
Figure 1B:
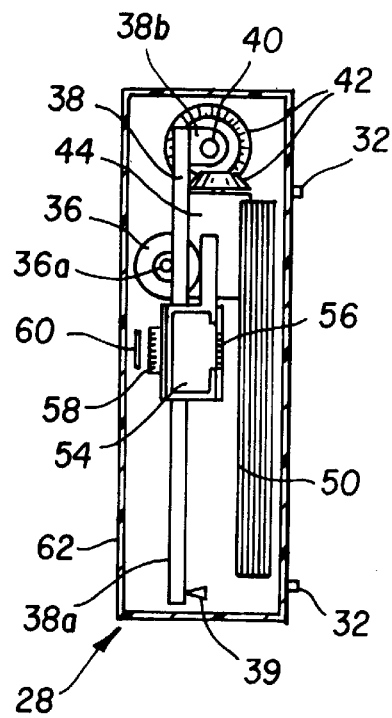

Turning now to FIG. 1a and 1b, a scanning ink jet printer 28 is shown that according to the current invention. A carriage 34 is driven in an X-Y pattern across dye receiver sheet 50. Carriage 34 is driven in a first direction by carriage motor 36 which is fixably attached to carriage 34. Carriage motor 36 operates on carriage rack 38 through carriage motor gear 36a. Carriage rack 38 passes through carriage 34, and has carriage rack drive detail 38a formed on a surface that permits carriage motor gear 36a to translate carriage 34 along the length of carriage rack 38 when carriage motor 36a is energized. Carriage rack 38 also incorporates carriage rack nut 38b that grips translation shaft 40. One end of carriage rack 38 is supported for translation by carriage rack support 39. Carriage rack nut 38b supports the other end of carriage rack 38. Detail, such as a thread, formed on translation shaft 40 and operates on detail within carriage rack nut 38b. As translation shaft 40 rotates, carriage rack 38 moves in a second axis of translation perpendicular to the motion of carriage 34 as it moves across carriage rack 38. Translation shaft 40 is rotated by translation drive 44 operating through translation gears 42.

Printer electronics 30 contains control circuitry to operate carriage motor 36 and translation drive 44. Connection between printer electronics 30 and carriage 34 is accomplished by the use of flexible ribbon cable 46. Power and control signals for components supported on carriage 34 are supplied by flexible ribbon cable 46. Cable 46 is oriented to flex with the motion of carriage 34 as carriage 34 operates over a printing and scanning area.

Carriage 34 supports a set of colored ink reservoirs 54 that contain yellow (54y), magenta (54m), and cyan (54c) dyes. Colored ink reservoirs 54 supply ink to ink jet head 56, which is energized to selectively apply ink to dye receiver sheet 50. Ink jet head has three sets of ink jet nozzles that selectively eject ink from colored ink reservoirs 54. In FIG. 1a, ink jet head 56 has applied ink to a written area of dye receiver sheet 50. Carriage 34 also supports a set of scanning heads 58 that read blue, green, and red colors through focusing optic 60. Scanning head 58 includes three linear arrays of sensor elements that are spaced to correspond with the three sets of ink jet nozzles in ink jet head 56 on the opposing face of carriage 34. Focusing optic 60 consists of a plurality of micro-optic elements that focus the illuminated image on camera display 18 onto the three arrays on scanning head 58 along optical path 61. A clear window 62 is formed in the body of printer 28 to permit passage of light along optical path 61 from camera display 18 into printer 28. The scanning head 58 and the ink jet head 56 are both mounted on the carriage 34. This arrangement is referred to as a scanner/ink jet printhead.

In the preferred embodiment, focusing optics 60 further incorporates separate red, green and blue dyed areas over each of the three sets of sensor elements. The red sensor is opposite the cyan ink jet nozzle, the green sensor array is located over the magenta ink jet nozzles, and the blue sensor is located opposite the yellow depositing ink jet nozzles. The ink jet head 56 includes a plurality of nozzles which correspond to the pitch of the pixels sensed by the scanning head 58 such that as the scanner ink jet printhead moves, the scanner scans the mirror image on the display and produces image signals. The ink jet head 56 is responsive to these signals and produces a correctly oriented inked image onto the dye receiver sheet 50. The camera display 18 responds to a digital image stored in camera electronics 16. The camera electronics 16 has caused display 18 to produce a mirror image when it is desired to scan such image. However, when it is desired to produce a correctly oriented image on the display, the camera electronics 16 is effective to produce that result. It is possible that the ink jet head 56 and dye receiver sheet 50 can be offset in this invention. However, differences in the pitch and spacing of sensing elements on scanning head 58 and between nozzle arrays ink jet head 56 would require buffering of data generated by scanning head 58 and ink jet head 56. The complicated buffering electronics are eliminated in the this embodiment by matching ink jet nozzle positions to the scanning element positions.

Figure 2:
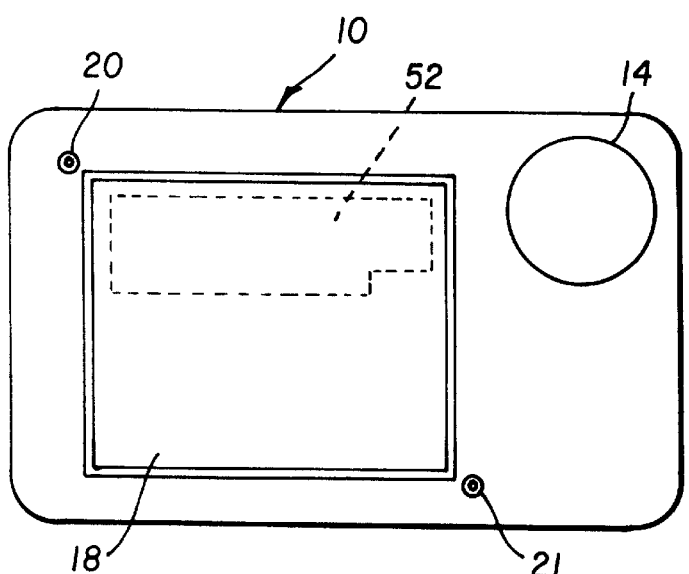
FIG. 2 is a rear view of an electronic camera in accordance with the present invention.

Communication and interconnection of printer 28 to electronic camera 10 is established through active printer pin 32 and printer pin 33. Active printer pin carries control signals from printer electronics 30. The printer pins provide interconnection to electronic camera 10 shown in FIG. 2. Electronic camera 10 is equipped with an active camera socket 20 and a passive camera socket 21 that match printer pins 32 and 33.

Figure 3:
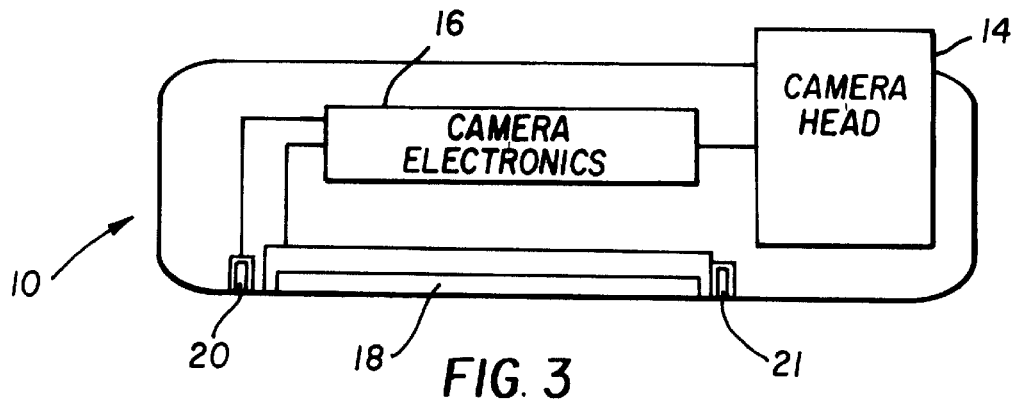
Figure 4:
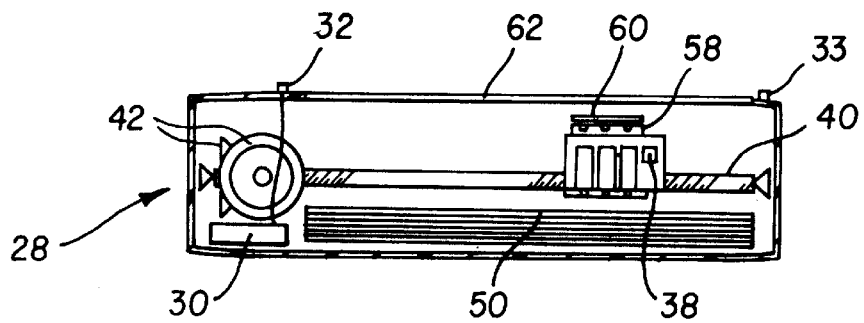

FIG. 3 is a sectional view of electronic camera 10. Electronic camera 10 is of conventional design and can capture either still or motion images. Images are captured by camera head 14 and transferred to camera electronics 16. Camera electronics 16 is capable of displaying still images on camera display 18. Camera display 18 can be for instance a LCD or organic polymer display system of conventional design. FIG. 4 is a sectional of view of printer 28 which shows detail needed for interconnection to electronic camera 10.

Electronic camera 10, in accordance with the present invention, includes the additional modification of an active camera socket 20 and a passive camera socket 21 for the purpose of securing the printer 28 over camera display 18. Active camera socket 20 incorporates electronic sensing circuitry to communicate with printer 12. Electronic sensing circuitry can be a wire active camera socket 20 to communicate with printer 12. Alternatively, a light sensing/transmitting assembly can be incorporated in or near the active camera socket 20.

Figure 5:
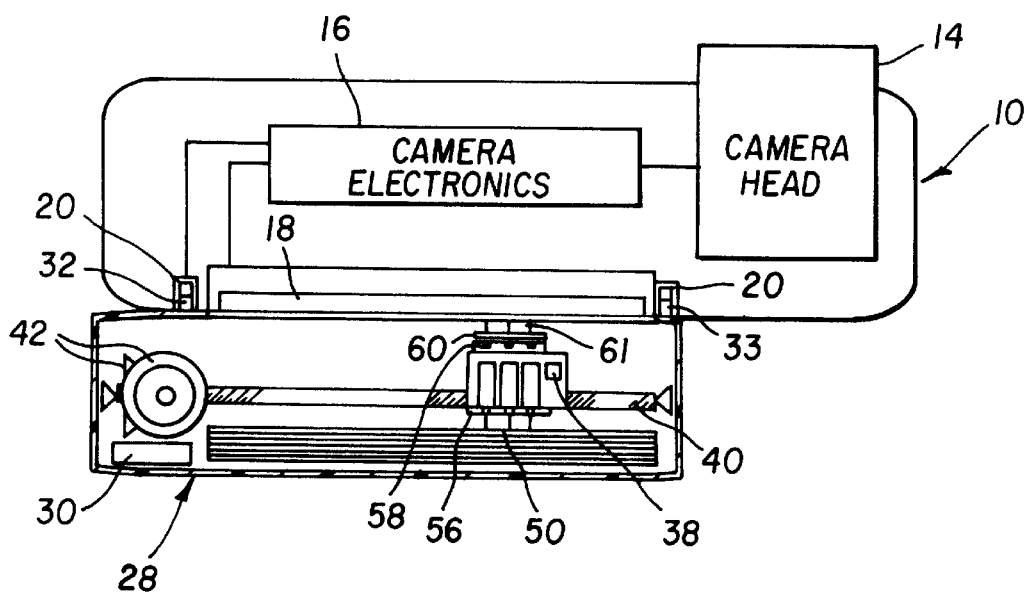
FIG. 5 shows the printing unit of FIG. 1a attached to the camera of FIG. 2.

An operator obtains a print by pressing printer 28 against electronic camera 10. FIG. 5 shows the printing unit of FIG. 1a attached to the camera of FIG. 2. Latch pins 32 and 33 secure printer 28 to electronic camera 10. The operator signals the start of printing using printer electronics 30. The printer's active pin 32 signals the camera electronics 16 to indicate that it is in condition for printing images on camera display 18 and to cause a mirror image to be displayed. Upon print initialization, electronic camera 10 provides such mirror image of a captured image to camera display 18.

Printer 28 positions carriage 34 into one corner of the display using carriage motor 36 and translation drive 44. Translation drive is actuated to move carriage 34 in a first direction across camera display 18. A synchronizing signal supplied through flexible ribbon cable 46 causes scanning head 58 to periodically sample the intensity of light from camera display 18. The sample data is used to control the deposition of ink by ink jet head 56. The nozzles in ink jet head and scanning elements in scanning head 58 are offset into three separate sections. These sections operate independently but start and stop operation as they enter and leave the printing area. Of course, the scanning head 58 and the ink jet head 56 (scanner ink jet printhead) moves simultaneously and are driven by the carriage 34.

After a single pass, carriage motor 36 is energized to move carriage 34 across carriage rack 38 a distance that corresponds to the width of a single scan-print pass. Successive passes are made to transfer the image on camera display 18 onto dye receiver sheet 50. Because the image on camera display 18 has been mirrored, data from scanning head 58 drives the nozzles in ink jet head 56 without electronics to store or mirror data in a single pass. Both camera display 18 and dye receiver sheet 50 are stationary during scan printing. This creates a small configuration for the display scan printer 28. The nozzles in ink jet head 56 and the pixels of scanning head 58 have the same pitch which permits a direct flow of data from the scanning elements to the nozzles.

Prior art has been directed to scan-printers that operate on documents. The scanning system in such apparatus requires a source of illumination to read image data on the sheets. The current invention uses the light emission capability of camera display 18 to eliminate the need for an image illumination system found in prior scan-printers. Eliminating a light source in printer 28 reduces cost and power demand.

The invention has been described in detail with particular reference to a certain preferred embodiment thereof, but it will be understood that variations and modifications can be effected within the spirit and scope of the invention.

PARTS LIST

- 10 electronic camera
- 14 camera head
- 16 camera electronics
- 18 camera display
- 20 active camera socket
- 21 camera socket
- 28 printer
- 30 printer electronics
- 32 active printer pin
- 33 printer pin
- 34 carriage
- 36 carriage motor
- 36a carriage motor gear
- 38 carriage rack
- 38a carriage rack drive detail
- 38b carriage rack nut
- 39 carriage rack support
- 40 translation shaft
- 42 translation gears
- 44 translation drive
- 46 flexible ribbon cable
- 50 dye receiver sheet
- 52 written area
- 54 colored ink reservoirs
- 56 ink jet head
- 58 scanning head
- 60 focusing optic
- 61 optical path
- 62 clear window

What is claimed is:

1. Apparatus for capturing images from a display and ink jet printing such images onto a receiver sheet, comprising:
   a) electronic means for storing a digital image;
   b) a display;
   c) means coupled to the display and responsive to the stored digital image for producing a mirror image on the display;
   d) a printer disposed in operative relationship to the display and having a moveable carriage, and a scanner and an ink jet printhead mounted on the carriage, and being arranged so that as the carriage moves, the scanner scans the mirror image on the display and produces image signals; and
   e) the ink jet printhead being responsive to the signals produced by the scanner for producing a correctly oriented image onto the receiver sheet.

2. The apparatus according to claim 1 wherein the ink jet printhead includes a plurality of nozzles which correspond to the pitch of the pixels sensed by the scanner.

3. Apparatus for capturing images from a display and ink jet printing such images onto a receiver sheet, comprising:
   a) electronic means for storing a digital image;
   b) a display;
   c) means coupled to the display and responsive to the stored digital image for producing an image on the display, said image producing means producing, in a first condition, a correctly oriented image on the display, and in a second condition, a mirror image on the display, and;
   d) a printer which is connected in operative relationship to the display for causing the display to be effective in a second condition and having a moveable carriage, and a scanner and an ink jet printhead mounted on the carriage, and being arranged so that as the carriage moves, the scanner scans the mirror image on the display and produces image signals; and
   e) the ink jet printhead being responsive to the image signals produced by the scanner for producing the correctly oriented image onto the receiver sheet.

4. The apparatus according to claim 3 wherein the ink jet printhead includes a plurality of nozzles which are spaced so that they correspond to the pitch of the pixels sensed by the scanner.

5. An attachable printer for use with a electronic camera having an image sensor and means for focusing an image of a subject onto the image sensor, the electronic camera comprising:
   a) electronic means coupled to the image sensor for storing a digital image of the subject;
   b) a display; and
   c) means coupled to the display and responsive to the stored digital image for producing an image on the display, said image producing means producing, in a first condition, a correctly oriented image on the display, and in a second condition, a mirror image on the display;
   d) means connected in operative relationship to the display for causing the display to be effective in a second condition and having a moveable scanner/ink jet printhead arranged so that as the scanner/ink jet printhead moves, the scanner scans the mirror image on the display and produces image signals; and
   e) the ink jet printhead being responsive to the image signals produced by the scanner for producing the correctly oriented image onto the receiver sheet.

6. The attachable printer according to claim 5 wherein the ink jet printhead includes a plurality of nozzles which are spaced so that they correspond to the pitch of the pixels sensed by the scanner.

7. The invention of claim 5 wherein the ink jet printhead includes nozzles for printing colored inks.

\* \* \* \* \*